United States Patent
Tanaka et al.

(10) Patent No.: US 6,646,780 B2
(45) Date of Patent: Nov. 11, 2003

(54) SHEET-LIKE DISPLAY MEDIUM INCLUDING SWITCHING LAYER, AND DISPLAY ELEMENT AND DEVICE UTILIZING THE SAME

(75) Inventors: Haruo Tanaka, Kyoto (JP); Chihaya Adachi, Chitose (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 10/167,614

(22) Filed: Jun. 11, 2002

(65) Prior Publication Data

US 2003/0020393 A1 Jan. 30, 2003

(30) Foreign Application Priority Data

Jun. 11, 2001 (JP) .......................... 2001-175377

(51) Int. Cl.[7] .......................... G02F 1/29; G02F 1/153; G02F 1/133; H01J 63/04; H01J 31/50

(52) U.S. Cl. .................. 359/320; 359/267; 359/271; 359/275; 359/237; 349/14; 349/33; 313/483; 313/525; 250/214 VT

(58) Field of Search ................. 359/237, 271, 359/265, 275, 320, 321, 322, 315; 313/483, 525; 349/14, 33, 141; 250/214 VT

(56) References Cited

U.S. PATENT DOCUMENTS 4,400,059 A  *  8/1983  Nagae et al. ................. 349/33

4,680,461 A  *  7/1987  Boit et al. ............. 250/214 VT
5,751,471 A  *  5/1998  Chen et al. .................. 359/320
5,990,991 A  * 11/1999  Tillin et al. ..................... 349/33
6,097,451 A  *  8/2000  Palmer et al. ................. 349/14
6,147,792 A  * 11/2000  Jones et al. .................. 359/320
6,501,457 B1 * 12/2002  Bruechmann et al. ...... 359/267
6,509,701 B1 *  1/2003  Rakhimov et al. .......... 313/525

FOREIGN PATENT DOCUMENTS

| JP | 04-070694 | 3/1992 |
| JP | 07-111341 | 4/1995 |
| JP | 08-241048 | 9/1996 |

OTHER PUBLICATIONS

Potember, et al., "Electrical Switching And Memory Phenomeha h CU–TCNQ Thin Films", Appl. Phys. Lett. 34(6), pp. 405–407, Mar. 15, 1979.

Potember, et al., "Optical Switching In Semiconductor Organic Thin Films", Appl. Phys. Lett. 41(6), pp. 548–550 Sep. 15, 1982.

* cited by examiner

Primary Examiner—Loha Ben
(74) Attorney, Agent, or Firm—Merchant & Gould P.C.

(57) ABSTRACT

A sheet-like display medium includes a switching layer containing a switching material having a light absorption spectrum which changes in a visible light range when a voltage no less than a threshold value is applied while also maintaining the changed light absorption spectrum even after the voltage application is interrupted, and an electrode layer laminated on the switching layer. The switching material may be an organic metal complex such as Cu-TCNQ or Ag-TCNQ.

22 Claims, 7 Drawing Sheets

SHEET-LIKE DISPLAY MEDIUM INCLUDING SWITCHING LAYER, AND DISPLAY ELEMENT AND DEVICE UTILIZING THE SAME

BACKGROUND OF THE INVENTION

1. Field of the Invention

The present invention relates to a display medium including a switching layer. More specifically, the present invention relates to a light-reflective or light-transmissive display medium including a switching layer whose light absorption spectrum in the visible light range changes due to voltage application. The present invention also relates to a display element and a display device utilizing such a display medium.

2. Description of the Related Art

Recently, in the field of display technique, thin displays are actively developed, and much attention is focused on liquid crystal displays, plasma displays and organic EL displays. Particularly, liquid crystal displays have been rapidly developed and are widely used for example in a mobile phone or an electronic notebook which require displaying with low power consumption, and in a television, a PC or a car navigation system which require high-resolution color display.

FIG. 7 is a sectional view illustrating an example of light-transmissive liquid crystal display. The liquid crystal display 70 shown in FIG. 7 includes a pair of panels 71, 72, spacers 73 for defining a desired gap between the two panels 71, 72, a liquid crystal material 74 filled in the gap, and a sealing member 75 for enclosing the liquid crystal material 74 between the panels 71 and 72. The liquid crystal display 70 further includes a driving circuit and a backlight, which are not illustrated.

The panel 71 includes a glass substrate 71a, transparent electrodes 71b and TFTs (not shown) arranged on an inner surface of the glass substrate 71a, an alignment layer 71c formed on the inner surface of the glass substrate 71a to cover the transparent electrodes 71b and the TFTs, and a polarizer 71d formed on the outer surface of the glass substrate 71a. The panel 72 includes a glass substrate 72a, transparent electrodes 72b arranged on the inner surface of the glass substrate 72a, an alignment layer 72c formed on the glass substrate 72a for covering the transparent electrodes 72b, and a polarizer 72d formed on the outer surface of the glass substrate 72a. Generally, the polarizer 72d is arranged so that its axis extends parallel to or forms a right angle with respect to the axis of the polarizer 71d. The driving circuit is connected to the transparent electrodes 71b, 71b. The backlight is arranged so that light travels from the side of the panel 71 toward the panel 72.

The liquid crystal display 70 having such a structure displays an image by applying a voltage to selected elements or dots defined between the transparent electrodes 71b and the transparent electrodes 72b. Specifically, the application of a voltage to the selected portions or dots between the transparent electrodes 71b, 72b generates an electric field between the electrodes, which changes the alignment of the liquid crystal material 74 at the dots. The change in the alignment of the liquid crystal material 74 and the polarizing effect by the paired polarizers 71d, 72d cause a change in the transmittance of light emitted from the backlight, thereby displaying an image. For displaying of a color image, color filters may be disposed between the glass substrate 72a and the transparent electrodes 72b of the panel 72 to apply a color to transmitting light.

However, since the liquid crystal display 70 is a display device which utilizes polarizing effect, its viewing angle is relatively narrow, which limits the usage. Further, due to the presence of the polarizers 71d, 72d in the light path, the loss of light emitted from the light source is relatively high. Moreover, the utilization of liquid crystal, which is not a solid matter, poses problems that the display is vulnerable to mechanical shock and the display need be used under a restricted ambient temperature condition for proper operation. Further, since each element constituting the liquid crystal display 70 does not have a memory function, a switching element or capacitor element such as a TFT having a relatively complicated structure need be separately provided for each element. A reflective liquid crystal display may also suffer these technical disadvantages.

Moreover, the manufacturing of the liquid crystal panel 70 is rather difficult due to the peculiar structure of the liquid crystal panel 70. Specifically, to properly load the liquid crystal material 74 between the paired panels 71, 72, spacers 73 and a sealing member 75 need be interposed between the panels 71 and 72. Further, alignment layers 71c, 72c for determining the alignment of the liquid crystal material 74 and polarizers 71d, 72d need be disposed for completing the panels 71, 72.

DISCLOSURE OF THE INVENTION

It is, therefore, an object of the present invention to eliminate or lessen the problems of the prior art and to provide a display medium which has a simple structure to serve as a thin display and includes elements each having a memory function.

Another object of the present invention is to provide a display element having a memory function.

Still another object of the present invention is to provide a display device having a memory function.

According to a first aspect of the present invention, there is provided a sheet-like display medium comprising a switching layer containing a switching layer containing a switching material having a light absorption spectrum which changes in a visible light range when a voltage no less than a threshold value is applied while also maintaining the changed light absorption spectrum even after the voltage application is interrupted, and an electrode layer laminated on the switching layer.

With this structure, when a voltage is applied to selected portions of the display medium, the light absorption spectrum (i.e. color) of the switching layer changes at the portions to which the voltage is applied. The light absorption spectrum thus changed is maintained even after the voltage application is interrupted. Therefore, once images or characters are displayed on the display medium by the voltage application to the selected portions, they can be maintained.

For the switching material, use may be made of an organic metal complex having a light absorption spectrum which changes in the visible light range when a voltage no less than the threshold value is applied while also maintaining the changed light absorption spectrum even after the voltage application is interrupted. Preferably, the organic metal complex may be a metal complex of 7,7,8,8-tetracyanoquinonedimethane (hereinafter abbreviated as "TCNQ") or of a derivative of TCNQ (e.g. Ag-TCNQ and CU-TCNQ).

A metal complex of TCNQ or of a derivative of TCNQ changes its light absorption spectrum when a voltage is applied, and there is a threshold value of the voltage which need be reached for causing such a change. Therefore, the light absorption spectrum changes when a voltage no less than the threshold value is applied. Once the light absorption spectrum is changed, it is maintained even after the voltage application is interrupted. Thus, a metal complex of TCNQ or of a derivative of TCNQ has a memory function for keeping the changed light absorption spectrum.

FIG. 1 is a graph showing measurements of light transmittance of Ag-TCNQ in a non-switched state A, i.e. before a voltage is applied and in a switched state B, i.e. after a voltage is applied. As shown in the graph, with respect to the visible light range, Ag-TCNQ in the non-switched state A has a relatively high light transmittance in the wavelength range of about 450–600 nm and has a relatively low light transmittance in other wavelength ranges. On the other hand, with respect to the visible light range, Ag-TCNQ in the switched state B has a relatively high light transmittance in a wavelength range of no less than about 575 nm and has a relatively low light transmittance in the shorter wavelength ranges. The light transmittance measurements reflect the light absorption spectrum of the sample. Thus, it will be understood from FIG. 1 that the color of Ag-TCNQ in the switched state B, i.e. after a voltage is applied, differs from that in the non-switched state A, i.e. before a voltage is applied.

FIG. 2 is a graph showing measurements of light transmittance of Cu-TCNQ in a non-switched state C, i.e. before a voltage is applied and in a switched state D, i.e. after a voltage is applied. In the non-switched state C, the light transmittance is low for any wavelength in the visible light range. On the other hand, in the switched state D, the light transmittance is relatively high for a wavelength of no less than about 500 nm, whereas the light transmittance is relatively low for a wavelength of shorter than about 500 nm. Thus, it will be understood that the color and the amount of light transmittance of Cu-TCNQ differs between the non-switched state C and the switched state D, i.e. before ad after a voltage is applied.

It is considered that such a change in the light absorption spectrum occurs due to a change in the electronic structure of a metal complex of TCNQ or of the TCNQ derivative. Specifically, TCNQ or the TCNQ derivative before a voltage is applied is electron-rich because of an electron donated from the metal. When a voltage not smaller than the threshold value is applied, the electron is returned from TCNQ or the TCNQ derivative to the metal, which makes TCNQ or the TCNQ derivative neutral. It is considered that the change in light absorption spectrum occurs in this way. Conceivably, therefore, when a metal complex of TCNQ or of a derivative of TCNQ is used as a switching material, the deepness of the color after changing by the voltage application hardly depends on the amount of charge injected into the switching layer. In such a case, therefore, the present invention provides a color display element of the charge transfer type, not the charge injection type. Since the light absorption spectrum changes due to the charge transfer, not the charge injection, the deterioration of the switching material due to the charge injection is avoided, which is advantageous for increasing the lifetime of the display medium and the display element.

In a preferred embodiment of the present invention, the electrode layer is a light-transmissive electrode so that the display medium functions as a light-transmissive display medium which utilizes a backlighter for illuminating the switching layer through the electrode layer for displaying images.

In another preferred embodiment, the electrode layer is a light-reflective electrode or the electrode layer is a light-transmissive electrode on which a light-reflective layer is laminated so that the display medium functions as a light-reflective display medium which utilizes the external light for displaying images. Preferably, the light-transmissive electrode may be formed of ITO having a high light transmittance. Preferably, the light-reflective electrode may be formed of aluminum which highly reflects light while being capable of functioning as an electrode.

According to a second aspect of the present invention, there is provided a display element comprising an anode layer, a cathode layer, and a switching layer disposed between the anode layer and the cathode layer. The switching layer contains a switching material having a light absorption spectrum which changes in a visible light range when a voltage no less than a threshold value is applied while also maintaining the changed light absorption spectrum even after the voltage application is interrupted.

With this structure, when a voltage is applied between the anode layer and the cathode layer, a change occurs in the light absorption spectrum (i.e. color) of the switching layer electrically sandwiched between the anode layer and the cathode layer. The light absorption spectrum thus changed is maintained even after the voltage application is interrupted. Therefore, by utilizing a plurality of such display elements, a display medium can be provided including display elements each of which has a memory function. Thus, the same advantages as those described with respect to the first aspect of the present invention are obtained.

For the switching material, use may be made of an organic metal complex such as Ag-TCNQ and Cu-TCNQ, similarly to the first aspect of the present invention.

In a preferred embodiment of the present invention, the display element is a light-reflective element, and one of the anode layer and the cathode layer is a light-transmissive electrode, whereas the other of the anode layer and the cathode layer is a light-reflective electrode. Preferably, in this case, the light-reflective electrode is formed of aluminum.

In another preferred embodiment, the anode layer and the cathode layer are light-transmissive electrodes, and the display element further includes a backlighter for illuminating the switching layer with light through the anode layer or the cathode layer to serve as a light-transmissive element. Preferably, in this structure, the light-transmissive electrode is formed of ITO.

According to a third aspect of the present invention, there is provided a display device comprising a plurality of display elements arranged in a matrix including a plurality of rows and a plurality of columns. The plurality of display elements includes a common switching layer, a plurality of first electrode lines formed on one surface of the switching layer correspondingly to the rows of the matrix, and a plurality of second electrode lines formed on the other surface of the switching layer correspondingly to the columns of the matrix. The switching layer containing a switching material having a light absorption spectrum which changes in a visible light range when a voltage no less than a threshold value is applied while also maintaining the changed light absorption spectrum even after the voltage application is interrupted.

Preferably, the display device includes means for applying electric potential to each of the plurality of first electrode lines and each of the second electrode lines.

Other features and advantages of the present invention will become clearer from the description of the preferred embodiment given below with reference to the accompanying drawings.

DETAILED DESCRIPTION OF THE PREFERRED EMBODIMENTS

Preferred embodiments of the present invention will be described below with reference to the accompanying drawings.

Figure 3:
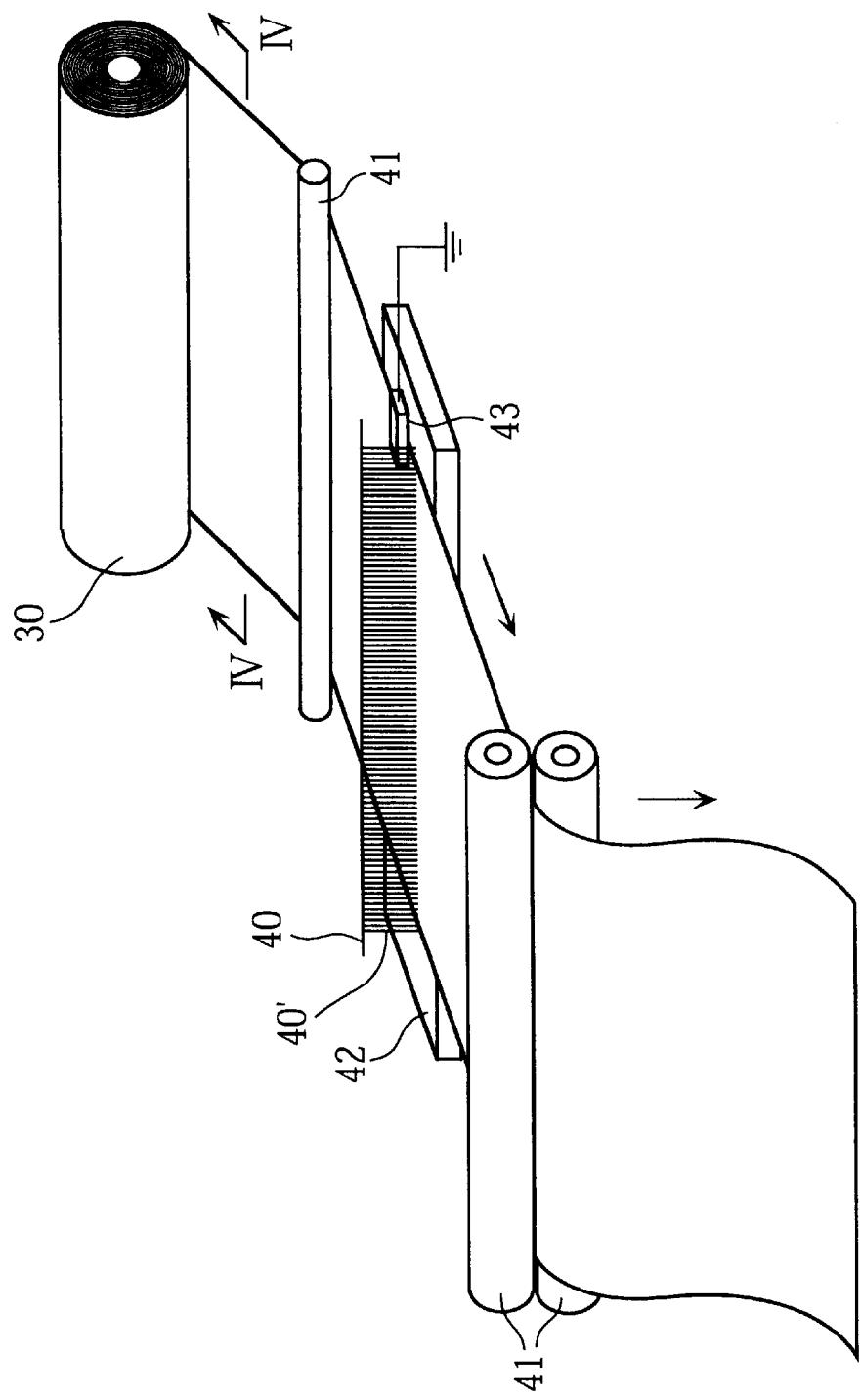
FIG. 3 is a perspective view illustrating a display medium according to a first embodiment of the present invention.
Figure 4:
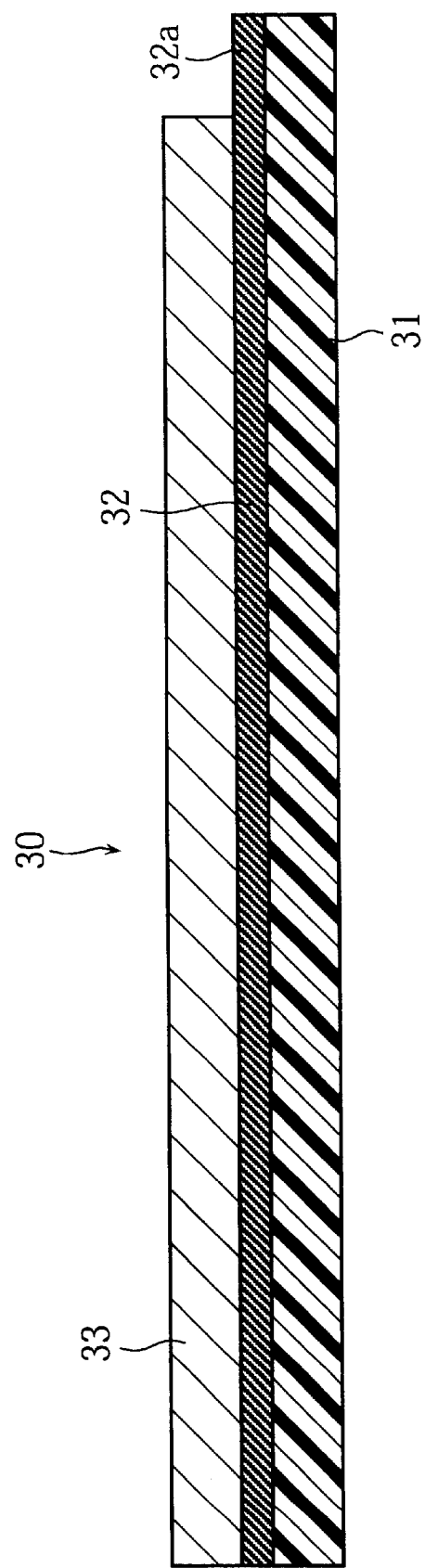
FIG. 4 is a sectional view taken along lines IV—IV in FIG. 3.

FIG. 3 illustrates a display medium according to a first embodiment of the present invention. In this figure, a sheet-like display medium 30 paid out from a roll is illustrated together with tooth-electrodes 40 for writing images on the display medium 30, a plurality of rollers 41 for transferring the display medium 30 and a tray 42 for guiding the display medium 30 at an intermediate portion of the transfer path. FIG. 4 is a sectional view taken along lines IV—IV of the display medium 30 shown in FIG. 3.

The display medium 30 according to the embodiment shown in FIGS. 3 and 4 is a light-reflective display medium. As shown in FIG. 4, the display medium 30 includes a flexible substrate 31, an electrode layer 32 laminated on the flexible substrate 31, and a switching layer 33 laminated on the electrode layer 32.

The flexible substrate 31, whose base material may be polyester or polyimide, has a thickness of 10–300 μm.

The electrode layer 32 is formed by applying aluminum to the flexible substrate 31 by sputtering or vapor deposition for example to have a thickness of 0.1–10 μm. Since aluminum has a silvery-white color, the electrode layer 32 functions not only as an electrode but also as a light-reflective layer.

Alternatively, a light-reflective layer may be provided separately from the electrode layer. For example, a light-reflective layer and an electrode layer may be separately provided by laminating a white layer on the flexible substrate 31 and laminating thereon a transparent electrode formed of ITO for example.

The switching layer 33 is formed of a switching material having such characteristics that its light absorption spectrum in the visible light range changes by the application of voltage and that the changed light absorption spectrum can be maintained even after the voltage application is interrupted. In this embodiment, the switching layer 33 is formed of Cu-TCNQ to have a thickness of 0.5–50 μm on the electrode layer 32.

The switching layer 33 maybe formed by building-up Cu-TCNQ directly on the electrode layer 32 by sputtering or by vacuum evaporation. Examples of vacuum evaporation include electron beam evaporation and resistive heating evaporation. Instead of directly building-up Cu-TCNQ, a copper film is first formed on the electrode layer 32 by sputtering or vapor deposition, and then a TCNQ layer is laminated thereon also by sputtering or vapor deposition. The copper film and the TCNQ layer are heated at 100–300° C. for five minutes, thereby forming Cu-TCNQ in situ on the electrode layer 32. Alternatively, a copper film having a thickness of 0.1–10 μm is formed on the electrode layer 32, and an acetonitrile solution saturated with TCNQ is applied by immersion for example, thereby depositing TCNQ as a copper complex on the electrode layer 32.

The switching layer 33 is retreated from a longitudinal edge of the display medium 30 to some extent. Therefore, the electrode layer 32 is exposed at the longitudinal edge of the display medium 30, thereby providing a terminal band 32a extending longitudinally of the display medium 30 on the opposite side of the flexible substrate 31. The terminal band 32a may be provided by forming the electrode layer 32 entirely over the flexible substrate 31 and then laminating a switching layer 33 on the electrode layer 32 so as to avoid the portion to become the terminal band 32a.

Referring to FIG. 3, description will be made as to writing of images or characters on the sheet-like display medium 30 constituting a so-called paper-like display. The tooth-electrode 40 for writing images extends widthwise of the display medium 30. The tooth-electrode 40 includes a plurality of teeth 40' aligned at a pitch of 10 μm-10 mm. The display medium 30 is transferred by the plurality of rollers 41 and supported by the tray 42 at a certain position in the transfer path. The tray 42 is provided with a terminal 43 which is grounded. In transferring the display medium 30, the terminal 43 comes into relative sliding contact with the terminal band 32a. If necessary, pressing means (not shown) may be provided for pressing the display medium 30 against the terminal band 32a with an appropriate force during the transferring for realizing a reliable sliding contact between the terminal band 32a and the terminal 43.

Figure 1:
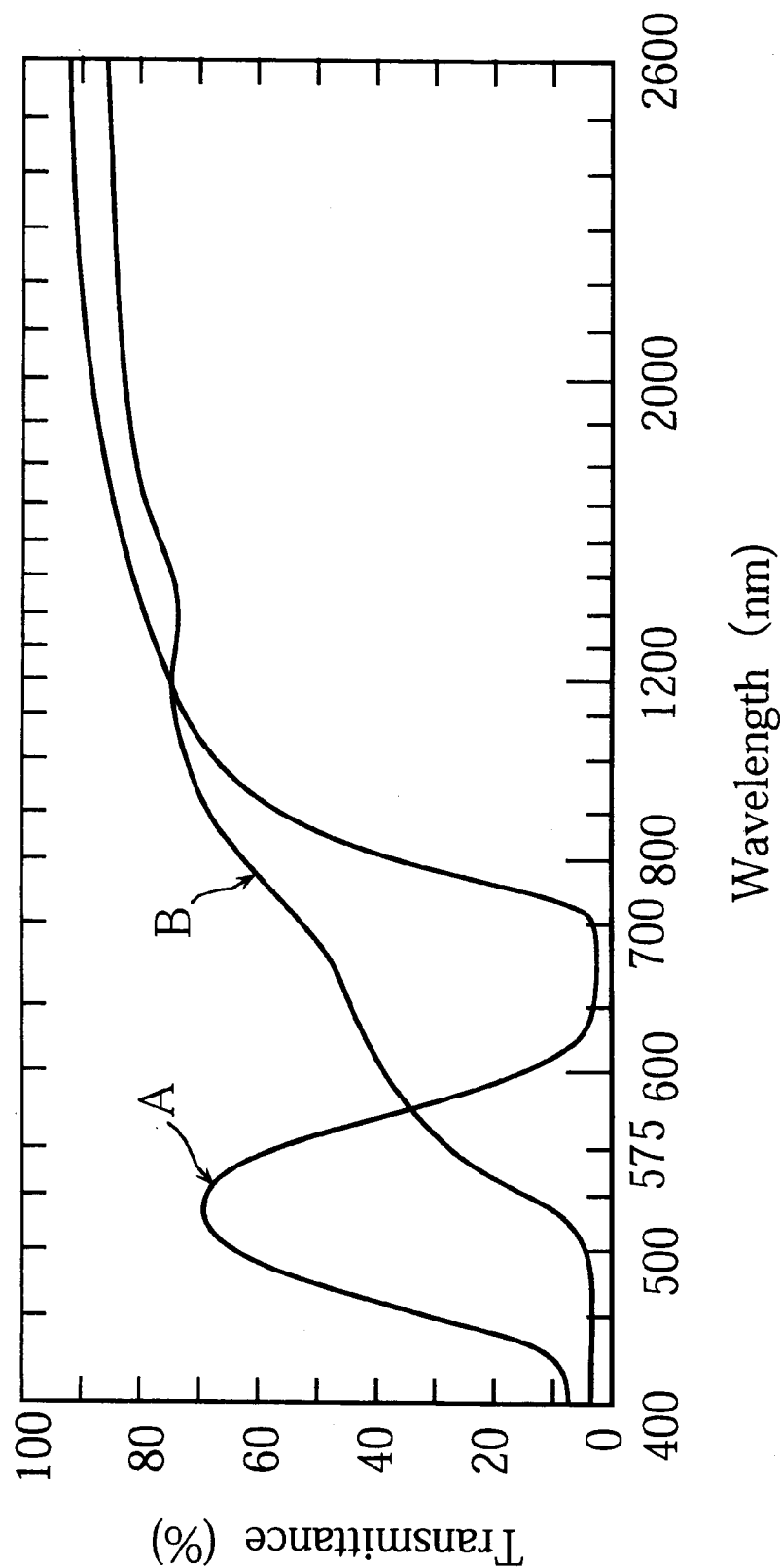
FIG. 1 is a graph showing the measurements of the light transmittance of Ag-TCNQ.
Figure 2:
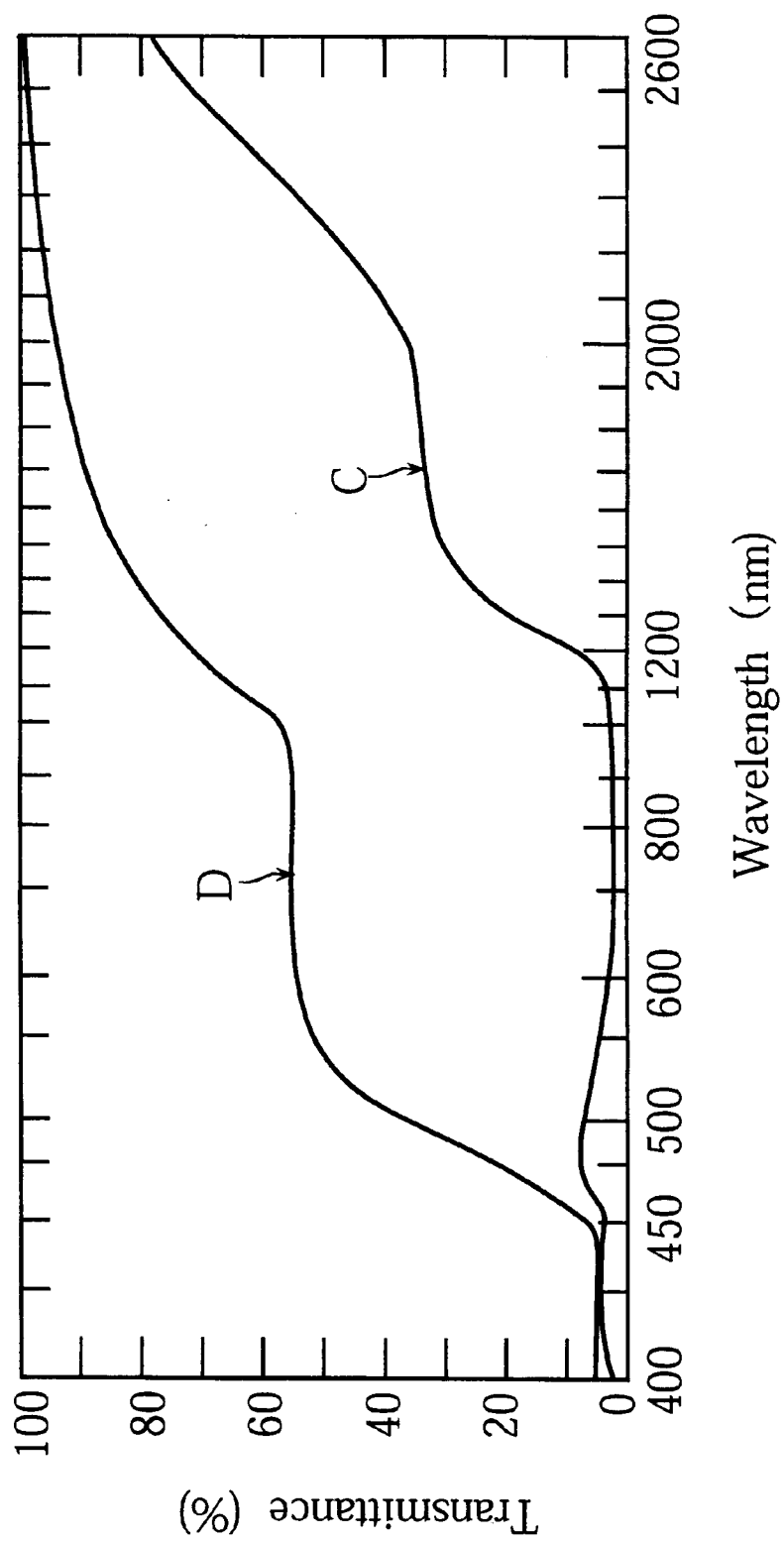
FIG. 2 is a graph showing the measurements of the light transmittance of Cu-TCNQ.

In the initial state of the display medium 30, the switching layer 33 formed of Cu-TCNQ is in the non-switched state C shown in FIG. 2, i.e. in the non-transmitting state. Therefore, almost no portion of the external light passes through the switching layer 33. As a result, the external light is not reflected at the light-reflective electrode layer 32, so that the display surface of the display medium 30 keeps a dark state.

The display medium in the initial state is brought into contact with tip ends of the teeth 40' of the tooth electrode 40. In this state, potential is applied to selected teeth of the tooth-electrode 30. When the potential difference between the teeth 40' and the electrode layer 32 (i.e. voltage applied to the switching layer 33) is equal to or higher than a threshold value, the light absorption spectrum of the switching layer 33 in the visible light range changes. Specifically, the switching layer 33, which had a color of light-absorptive dark purple in the non-switched state C of Cu-TCNQ, changes to a light-transmissive light yellow in the switched state D. Thus, the external light passes through the switching layer 33 at portions changed to the switched state D. The light is reflected at the silvery-white electrode layer 32 and passes through the switching layer 33 again for emission from the display medium 30. The threshold value of the voltage necessary for changing the absorption spectrum may vary in the range of from 0.1–15V depending on the thickness of Cu-TCNQ.

When the timing of voltage application by the tooth-electrode 40 is synchronized with the transfer distance of the display medium 30, the color in a predetermined region of the display medium 30 can be changed at the desired portions line by line, so that desired images or characters can be written in the predetermined region. In the present embodiment, a voltage is applied to the portions corresponding to image lines or characters to change the portions into the switched state D, so that the images or characters show up as bright lines on a dark background. Conversely, portions other than the portions corresponding to lines or characters may be changed into the switched state D by voltage application so that the images or characters show up as dark lines on a bright background.

In the present embodiment, Cu-TCNQ is used as the material of the switching layer 33. Therefore, images or characters are represented not only by a color change in the switching layer 33 but also by a change in the amount of light reflected at the electrode layer 32 due to a change in the light transmittance. However, instead of Cu-TCNQ, Ag-TCNQ may be used as the material for the switching layer 33 so that images or characters are represented mainly by a color change between the switched state B and the non-switched state A.

Figure 5:
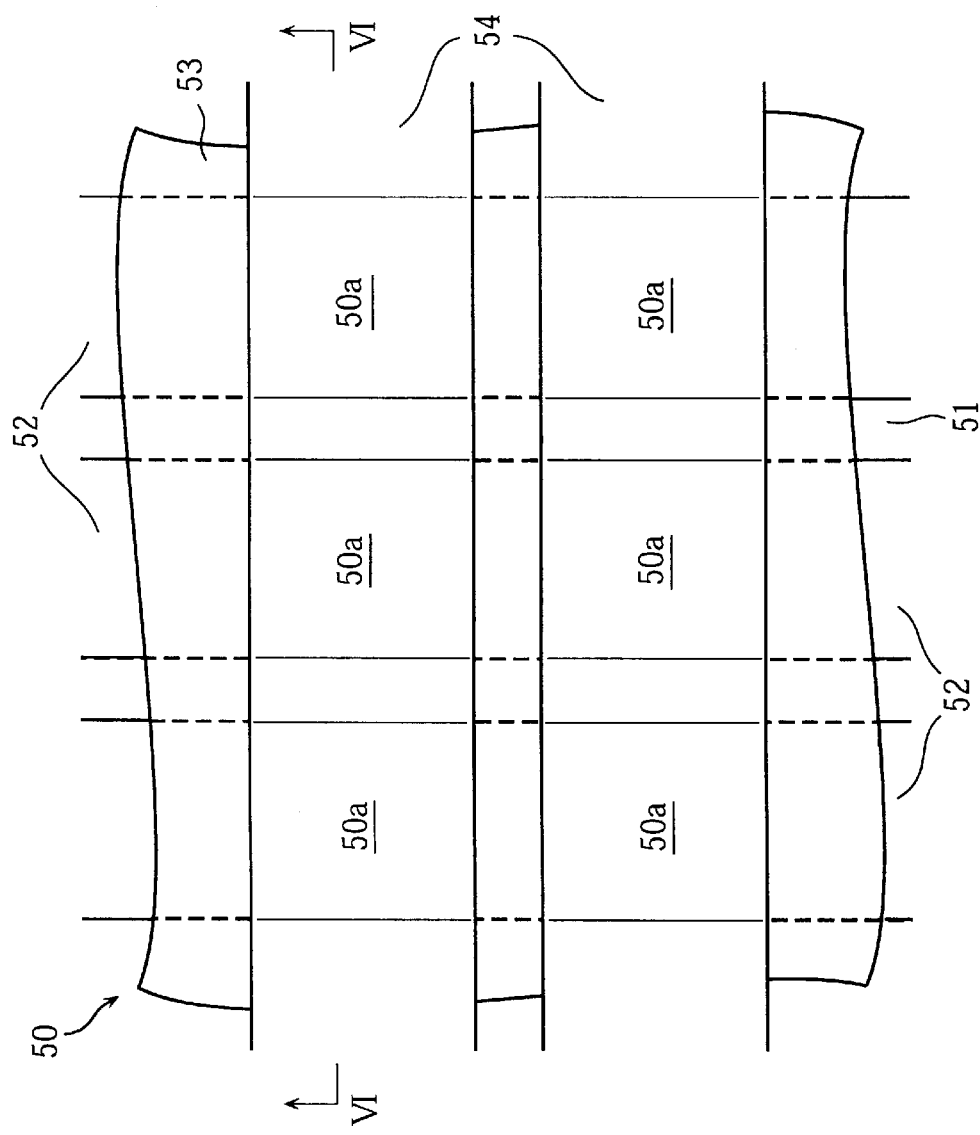
FIG. 5 is a plan view illustrating a display device according to a second embodiment of the present invention.
Figure 6:
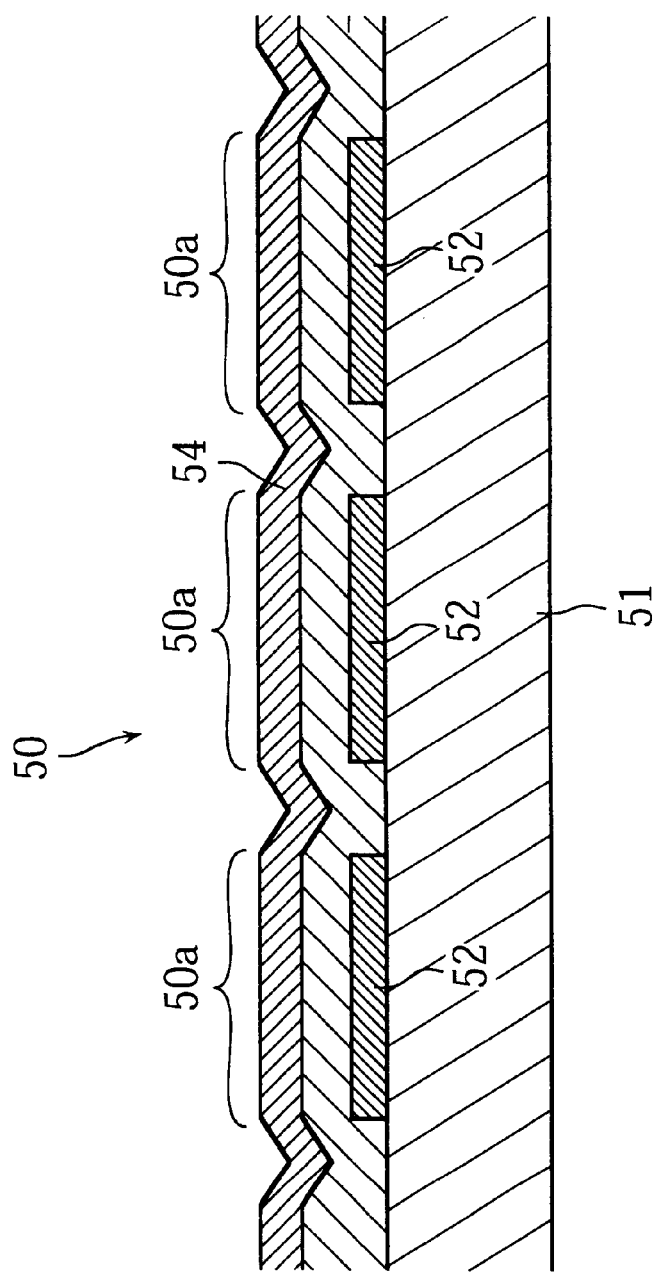
FIG. 6 is a sectional view taken along lines VI—VI in FIG. 5.
Figure 7:
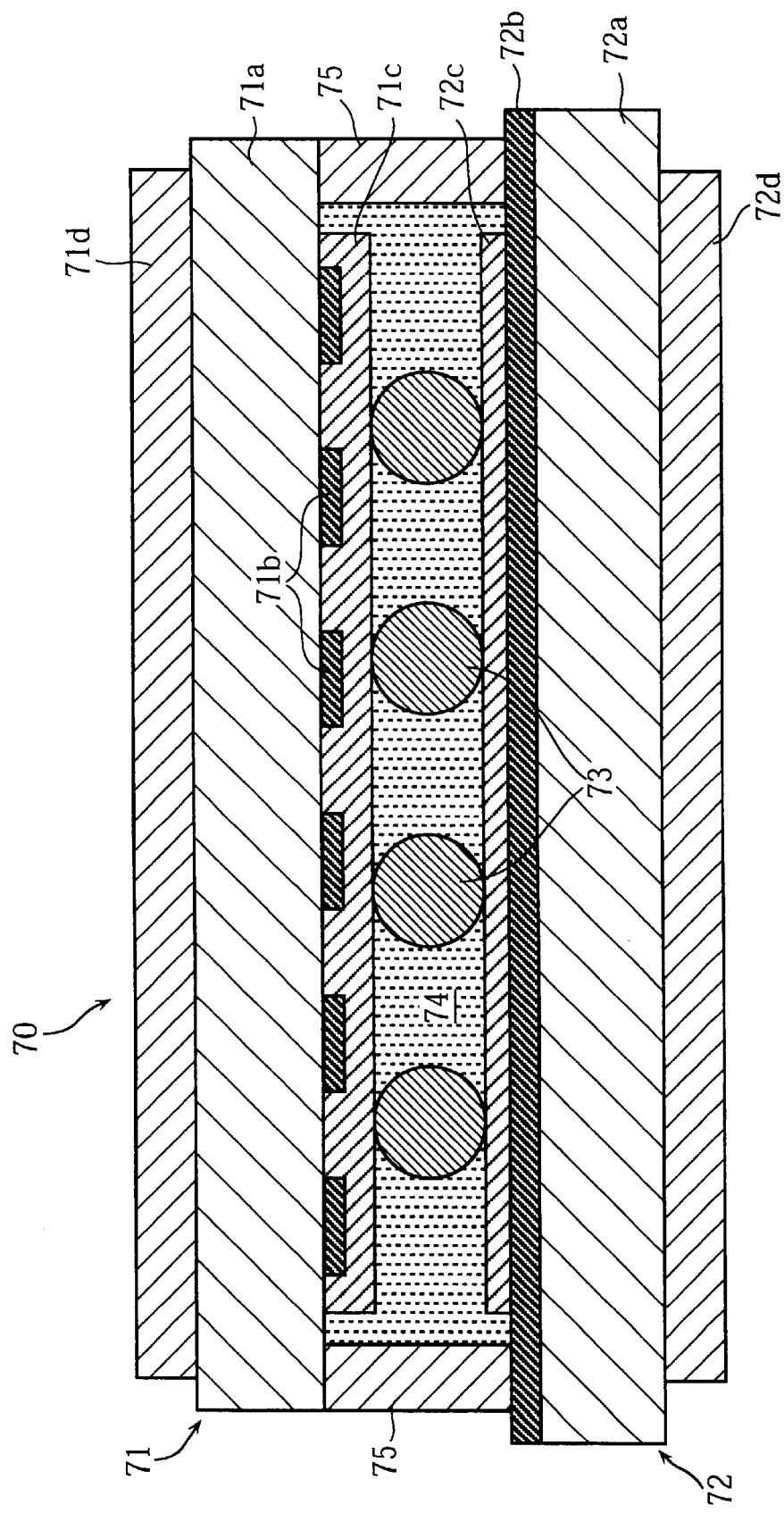
FIG. 7 is a sectional view showing an example of typical prior art liquid crystal display.

FIG. 5 is a plan view illustrating a display device according to a second embodiment of the present invention. FIG. 6 is a sectional view taken along lines VI—VI of the display device shown in FIG. 5. The display device 50 in this embodiment includes a glass substrate 51, a plurality of ITO electrodes 52 arranged parallel to each other at a predetermined pitch on the substrate, a switching layer 53 formed thereon, and a plurality of aluminum electrodes 54 arranged parallel to each other at a predetermined pitch on the switching layer 53. With this structure, the external light reaches the switching layer 53 through the transparent glass substrate 51 and the ITO electrodes 52, and the portion of the light reflected at the aluminum electrodes 54 is emitted to the outside also through the ITO electrodes and the glass substrate.

As clearly shown in FIG. 5, the ITO electrodes 52 and the aluminum electrodes 54 intersect to form a lattice as viewed in plan. The ITO electrodes 52 can be brought into conduction with the aluminum electrode 54 via the switching layer 53. Thus, each of the intersections between the ITO electrodes 52 and the aluminum electrodes 54 in the lattice provides a display element 50a, which comprises a pair of electrodes 52, 54 and the switching layer 53. Six display elements 50a are shown in FIG. 5.

To form such a display device 50 as shown in FIGS. 5 and 6, a thin ITO film having a thickness of 300–2000 Å is formed on a glass substrate 51 by vapor deposition or sputtering.

Subsequently, the thin ITO film is patterned to provide a plurality of ITO electrodes 52 arranged parallel to each other at a pitch of 10–100 $\mu$m for example on the substrate 51.

Then, to provide a switching layer 53, a Cu-TCNQ layer having a thickness of 0.1–10 $\mu$m for example is formed entirely over the glass substrate 51 from above the ITO electrodes 52. The formation of the switching layer 53 may be performed in the same manner as described with respect to the first embodiment (FIGS. 3 and 4).

Finally, an aluminum layer having a thickness of about 0.1–5 $\mu$m is deposited on the switching layer 53 by vacuum evaporation. The vacuum evaporation of the aluminum layer may be performed using a metal mask having a predetermined pattern, thereby providing a plurality of aluminum electrodes 54 arranged parallel to each other at a pitch of 10–100 $\mu$m on the switching layer 53.

At each of the display elements 50a (which comprises an ITO electrode 52, an aluminum electrode 54 and a switching layer 53) in the display device 50 thus formed, the absorption spectrum (light transmittance and color) in the visible light range changes (similarly to the first embodiment) when a voltage which is no less than a threshold value is applied across the electrodes. Therefore, by applying a voltage which is no less than the threshold value to selected dots of the display device 50, the display device 50 as a whole displays images or characters through the transparent glass substrate 51 and the ITO electrodes 52. Either of the ITO electrode 52 and the aluminum electrode 54 may be the anode or the cathode. Also in the present embodiment, similarly to the first embodiment, a voltage is applied to the portions corresponding to image lines or characters to change the portions into the switched state D, so that the images or characters show up as bright lines on a dark background. Alternatively, portions other than the portions corresponding to lines or characters may be changed into the switched state D by voltage application so that the images or characters show up as dark lines on a bright background.

In the present embodiment, Cu-TCNQ is used as the material of the switching layer 53. Therefore, images or characters are represented not only by a color change in the switching layer 53 but also by a change in the amount of light reflected at the aluminum electrode 54 due to a change in the light transmittance. However, instead of Cu-TCNQ, Ag-TCNQ may be used as the material for the switching layer 33 so that images or characters represented mainly by a color change between the switched state B and the non-switched state A.

In the present embodiment, a reflective display device is provided which includes aluminum electrodes 54 for utilizing the light reflectivity of aluminum. Alternatively, however, the aluminum electrodes 54 may be replaced with ITO electrodes 54' to sandwich the switching layer 53 between transparent electrodes, and the switching layer 53 may be illuminated with a backlighter for image display. With such a structure, the display device 50 functions as a light-transmissive display.

The display device 50 may be connected to a driver for applying a potential to the ITO electrodes 52 and the aluminum electrodes 54 for writing images or characters. Alternatively, the display device may be inherently provided with such a driver. To utilize the display device 50 as a color display, color filters or a coloring layers may be provided between the ITO electrodes 52 and the glass substrate 51.

Although the preferred embodiments of the present invention are thus described, the present invention is not limited to these embodiments and may be modified in various ways as far as it does not depart from the spirit of the invention set forth in the following claims.

What is claimed is:

1. A sheet-like display medium comprising:
    a switching layer containing a switching material having a light absorption spectrum which changes in a visible light range when a voltage no less than a threshold value is applied while also maintaining the changed light absorption spectrum even after the voltage application is interrupted; and
    an electrode layer laminated on the switching layer.

2. The display medium according to claim 1, wherein the switching material is an organic metal complex having a light absorption spectrum which changes in the visible light range when a voltage no less than the threshold value is applied while also maintaining the changed light absorption spectrum even after the voltage application is interrupted.

3. The display medium according to claim 2, wherein the organic metal complex is a metal complex of TCNQ or of a derivative of TCNQ.

4. The display medium according to claim 1, wherein the electrode layer is a light-reflective electrode.

5. The display medium according to claim 1, wherein the electrode layer is a light-transmissive electrode.

6. The display medium according to claim 5, further comprising a light-reflective layer laminated on the electrode layer.

7. A display element comprising:

an anode layer;

a cathode layer; and a switching layer disposed between the anode layer and the cathode layer, the switching layer containing a switching material having a light absorption spectrum which changes in a visible light range when a voltage no less than a threshold value is applied while also maintaining the changed light absorption spectrum even after the voltage application is interrupted.

8. The display element according to claim 7, wherein the switching material is an organic metal complex having a light absorption spectrum which changes in the visible light range when a voltage no less than the threshold value is applied while also maintaining the changed light absorption spectrum even after the voltage application is interrupted.

9. The display element according to claim 8, wherein the organic metal complex is a metal complex of TCNQ or of a derivative of TCNQ.

10. The display element according to claim 7, wherein one of the anode layer and the cathode layer is a light-transmissive electrode, whereas the other of the anode layer and the cathode layer is a light-reflective electrode.

11. The display element according to claim 10, wherein the light-reflective electrode is formed of aluminum.

12. The display element according to claim 10, wherein the light-transmissive electrode is formed of ITO.

13. The display element according to claim 7, wherein each of the anode layer and the cathode layer is a light-transmissive electrode, the display element further comprising a backlighter for illuminating the switching layer through the anode layer or the cathode layer.

14. The display element according to claim 13, wherein the light-transmissive electrode is formed of ITO.

15. A display device comprising a plurality of display elements arranged in a matrix including a plurality of rows and a plurality of columns;

the plurality of display elements including a common switching layer, a plurality of first electrode lines formed on one surface of the switching layer correspondingly to the rows of the matrix, and a plurality of second electrode lines formed on an opposite surface of the switching layer correspondingly to the columns of the matrix;

the switching layer containing a switching material having a light absorption spectrum which changes in a visible light range when a voltage no less than a threshold value is applied while also maintaining the changed light absorption spectrum even after the voltage application is interrupted.

16. The display device according to claim 15, wherein the switching material is an organic metal complex having a light absorption spectrum which changes in the visible light range when a voltage no less than the threshold value is applied while also maintaining the changed light absorption spectrum even after the voltage application is interrupted.

17. The display device according to claim 16, wherein the organic metal complex is a metal complex of TCNQ or of a derivative of TCNQ.

18. The display device according to claim 15, wherein one of the pluralities of electrode lines forms a light-transmissive electrode, whereas the other of the pluralities of electrode lines forms a light-reflective electrode.

19. The display device according to claim 18, wherein the light-reflective electrode is formed of aluminum.

20. The display device according to claim 18, wherein the light-transmissive electrode is formed of ITO.

21. The display device according to claim 15, wherein each of the pluralities of electrode lines forms a light-transmissive electrode, the display device further comprising a backlighter for illuminating the switching layer through the anode layer or the cathode layer.

22. The display device according to claim 21, wherein the light-transmissive electrode is formed of ITO.

* * * * *